US011172415B2

United States Patent
Bhumkar et al.

(10) Patent No.: US 11,172,415 B2
(45) Date of Patent: Nov. 9, 2021

(54) WIRELESS COMMUNICATION MANAGEMENT AND HANDOFFS

(71) Applicant: TIME WARNER CABLE ENTERPRISES LLC, St. Louis, MO (US)

(72) Inventors: Sunmeel Bhumkar, Clarksburg, MD (US); Zaheer Syed, Ashburn, VA (US); Sourabh Gupta, Ashburn, VA (US); Syed Ahsan, Manassas, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 1105 days.

(21) Appl. No.: 14/971,382

(22) Filed: Dec. 16, 2015

(65) Prior Publication Data
US 2017/0156090 A1    Jun. 1, 2017

Related U.S. Application Data

(60) Provisional application No. 62/285,011, filed on Nov. 30, 2015.

(51) Int. Cl.
| H04W 36/00 | (2009.01) |
| H04L 29/06 | (2006.01) |
| H04W 12/062 | (2021.01) |

(52) U.S. Cl.
CPC ......... *H04W 36/0061* (2013.01); *H04L 63/08* (2013.01); *H04W 12/062* (2021.01); *H04W 36/0038* (2013.01); *H04W 36/00835* (2018.08)

(58) Field of Classification Search
CPC . H04W 36/0061; H04W 36/08; H04W 48/10; H04L 63/08
See application file for complete search history.

(56) References Cited

U.S. PATENT DOCUMENTS

| 8,498,229 B2 * | 7/2013 | Sood ..................... G06F 1/3293 370/311 |
| 8,929,328 B2 * | 1/2015 | Wu ........................ H04W 36/10 370/331 |

(Continued)

OTHER PUBLICATIONS

Fotouhi et al., "Reliable and Fast Hand-Offs in Low-Power Wireless Networks," IEEE Transactions on Mobile Computing Year: 2014 | vol. 13, Issue: 11 | Journal Article | Publisher: IEEE.*

(Continued)

*Primary Examiner* — Roderick Tolentino
(74) *Attorney, Agent, or Firm* — Armsi IP Law, LLC

(57) ABSTRACT

A first wireless access point notifies a handoff management resource that a second wireless access point is a potential handoff candidate. Subsequent to authentication of the second wireless access point as being a valid handoff candidate, the handoff management resource notifies a mobile communication device that the second wireless access point is a valid handoff option to receive a communication session from the first wireless access point. To perform a handoff, the mobile communication device initiates termination of a wireless communication link with the first wireless access point and communicates with the second wireless access point to establish a new wireless communication link. In furtherance of providing uninterrupted network access, the handoff management resource conveys communication settings information associated with the handed off communication session to the second wireless access point for use over the new wireless communication link.

25 Claims, 9 Drawing Sheets

(56) References Cited

U.S. PATENT DOCUMENTS

| | | | | |
|---|---|---|---|---|
| 2005/0130658 A1* | 6/2005 | Stephens | ............... | H04W 36/26 455/436 |
| 2006/0176855 A1* | 8/2006 | Oh | .................... | H04W 36/0055 370/331 |
| 2006/0187873 A1* | 8/2006 | Friday | ................... | H04W 48/20 370/328 |
| 2007/0201540 A1* | 8/2007 | Berkman | ............... | H04B 3/542 375/219 |
| 2008/0117875 A1* | 5/2008 | Bennett | ................ | H04W 36/32 370/331 |
| 2008/0233916 A1* | 9/2008 | Wang | ................... | H04W 76/50 455/404.2 |
| 2008/0267407 A1* | 10/2008 | Vanderveen | .......... | H04L 9/0841 380/277 |
| 2008/0268844 A1* | 10/2008 | Ma | .................... | H04W 36/0033 455/436 |
| 2009/0191879 A1* | 7/2009 | Ichikawa | ........ | H04W 36/00837 455/442 |
| 2012/0322407 A1* | 12/2012 | Haberman | ........ | H04W 12/0431 455/411 |
| 2014/0273935 A1* | 9/2014 | Hyde | ................... | H04M 15/82 455/406 |
| 2016/0286457 A1* | 9/2016 | O'hare | .................. | G01C 21/26 |

OTHER PUBLICATIONS

Tayebi et al., "Seamless hand-off mechanism for high mobility broadband wireless access using 60 GHz Radio-over-Fiber networks," 16th Opto-Electronics and Communications Conference Year: 2011 | Conference Paper | Publisher: IEEE.*

* cited by examiner

WIRELESS COMMUNICATION MANAGEMENT AND HANDOFFS

RELATED APPLICATIONS

This application is a continuation of earlier filed U.S. patent application Ser. No. 14/953,818 entitled "WIRELESS COMMUNICATION MANAGEMENT AND HANDOFFS,", filed on Nov. 30, 2015, the entire teachings of which are incorporated herein by this reference.

BACKGROUND

Conventional computer devices typically have the ability to identify a presence of available WiFi™ access points. For example, according to current technology, to learn of one or more access points in a wireless region, a computer device can listen for so-called beacons from wireless access points indicating their identities (a.k.a., SSIDs).

In addition to or as an alternative to monitoring beacons, a communication device can be configured to transmit a wireless query signal (e.g., a probe request) in a region. In response to the wireless query signal, any of one or more active WiFi™ network access points in the region will respond with information indicating their identities (a.k.a., SSIDs). The communication device then chooses from available access points and establishes a respective wireless communication link with a first wireless access point.

Subsequent to establishing a wireless communication link with the first wireless access point and communicating through the first wireless access point to access a remote network such as the Internet, assume that the respective user roams outside a coverage region provided by the first wireless access point into a wireless coverage provided by a second wireless access point. In such an instance, the communication system can be configured to initiate a handoff of the wireless communication link between the corresponding mobile computer device and the first wireless access point which can include establishing a new wireless communication link between the mobile computer device and the second wireless access point.

BRIEF DESCRIPTION OF EMBODIMENTS

Uses of conventional wireless networks to perform handoffs suffer from a number of deficiencies. For example, according to conventional techniques of performing handoffs in a wireless network, there is a certain amount of downtime during a wireless handoff in which a corresponding mobile computer device is unable to communicate with a target network such as the Internet.

As a more specific example, conventional wireless handoffs sometimes include first terminating a wireless communication link with a first wireless access point (resulting in no Internet access) and then establishing a new wireless communication link with a second wireless access point. To establish the new wireless communication link during the handoff, certain conventional techniques require that the corresponding mobile computer device be authenticated in each case. This means that, during the handoff, the mobile computer device will experience downtime in which the mobile computer device is unable to access the Internet because of the re-authentication and establishment of new encryption keys. This disclosure includes the observation that network access downtime is often undesirable to a subscriber because continuous access to a target network may be critical.

In contrast to conventional techniques, embodiments herein provide novel ways of performing wireless handoffs of communication sessions, reducing a downtime of a user and corresponding device not being connected to a remote network (such as the Internet) during the handoff.

More specifically, in accordance with one embodiment, a wireless network environment includes multiple wireless access points including at least a first wireless access point (such as manufactured by a first vendor) and a second wireless access point (such as manufactured by a second vendor).

During operation, the first wireless access point monitors a wireless region for presence of neighboring wireless access points. Assume in this illustrative embodiment that the first wireless access point receives a notification indicating presence of the second wireless access point in the wireless network environment. The first wireless access point can learn of the presence of the second wireless access point in any suitable manner. In one embodiment, the first wireless access point learns of the presence of the second wireless access point via receipt of a corresponding wireless message (such as a broadcasted beacon) from the second wireless access point indicating its presence.

In furtherance of supporting seamless or near seamless wireless handoffs as described herein, the first wireless access point checks whether the first wireless access point is a candidate in which to perform handoff of communication sessions from the first wireless access point. To this end, the first wireless access point forwards an identity of the second wireless access point to a resource such as an authentication server resource. In response to receiving the authentication request, the authentication server resource pre-validates the second wireless access point for receiving subsequent handoffs from the first wireless access point.

In this example embodiment, assume that the authentication server resource provides notification (such as an authentication response) to the first wireless access point indicating that the second wireless access point is a valid handoff candidate for communication sessions supported by the first wireless access point because both the first wireless access point and the second wireless access point are part of a corresponding service provider's network. Note that, as further discussed below, the first wireless access point and the second wireless access point reside in different service provider's networks but which provide support cross usage by respective subscribers. In such an instance, even though the wireless access points reside in different service provider's networks, the second wireless access point is still a valid candidate in which to perform handoffs of communication sessions from the first wireless access point to the second wireless access point.

In response to receiving notice of valid pre-authentication of the second wireless access point, a handoff management resource (such as in the first wireless access point or other suitable resource) produces neighbor information associated with the first wireless access point to include an identity of the second wireless access point as a valid handoff candidate. Accordingly, generated neighbor information (or a neighbor list) associated with the first wireless access point indicates that the second wireless access point is a valid wireless access point in which to perform a handoff from the first wireless access point.

In accordance with further embodiments, the mobile communication device or other suitable resource can be configured to decide whether to initiate a respective handoff to the second wireless access point during a roaming event. For example, a management resource can be configured to distribute the neighbor information (neighbor list) to the mobile communication device. Assume that the mobile communication device or other suitable resource chooses the second wireless access point from the neighbor information in which to perform a respective handoff. In furtherance of such a decision, the mobile communication device disassociates itself with the first wireless access point to terminate an original wireless communication link established with the first wireless access point. The mobile communication device communicates session identifier information (such as an identity of the communication session supported by the first wireless access point) to the second wireless access point in order to perform the handoff. The second wireless access point uses the session identifier information associated with the communication session to retrieve appropriate communication settings information associated with the original communication session between the first wireless access point and the mobile communication device. The second wireless access point uses the communication settings information to provide a seamless or nearly seamless handoff of the communication session.

Alternatively, in accordance with yet further embodiments, note that a resource other than mobile communication device can decide to perform a respective handoff with respect to the communication sessions supported by the first wireless access point. For example, a handoff management resource remotely located with respect to the mobile communication device can be configured to make a decision to handoff a current communication session associated with the mobile communication device from the first wireless access point to the second wireless access point based at least in part on the neighbor information indicating pre-authentication of the second wireless access point as a handoff candidate.

Thus, pre-generation of the neighbor list information simplifies a handoff decision because it is already known which of multiple wireless access points in a wireless network environment are valid candidates in which to perform handoffs.

To initiate a handoff, the remote management resource can be configured to initiate transmission of a wireless communication indicating a handoff decision from the first wireless access point to the mobile communication device. The wireless communication conveyed to the mobile communication device from the first wireless access point includes the identity of the second wireless access point. This notifies the mobile communication device to perform a handoff with the second wireless access point. In furtherance of the handoff, the mobile communication device communicates with the second wireless access point to perform the respective handoff.

In a similar manner as previously discussed, the second wireless access point can be configured to receive communication setting information (associated with the original communication session between the first wireless access point and the mobile communication device) to support a seamless handoff. In one embodiment, to facilitate the handoff of the communication session from the first wireless access point to the second wireless access point, the management resource forwards communication settings information associated with the communication session (originally between the mobile communication device and the first wireless access point) to the second wireless access point.

In accordance with embodiments herein, regardless of whether the mobile communication device or a remote handoff management function makes a decision to perform a handoff, the pre-authentication of neighboring wireless access points and generation of neighbor list assists in providing more seamless handoffs across different vendor equipment or partner networks, reducing Internet access downtime for subscribers. As previously discussed, conventional handoffs with respect to different vendor equipment or service provider networks require that the mobile communication device terminate a current wireless communication link and then establish a new wireless communication link (with new encryption keys) in order to access a respective network.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs (instructions) to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium (media) such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, computer processor hardware, executable code, etc., that supports operations as discussed herein.

One or more embodiment as described herein includes a computer readable storage medium, system, hardware, etc., having instructions stored thereon. The instructions, when executed by computer processor hardware (such as associated with a user-operated communication device), cause the computer processor hardware of the system to execute operations of: receiving a notification indicating presence of a second wireless access point in the wireless network environment; determining that the second wireless access point is valid in which to perform handoffs from the first wireless access point; and producing neighbor information associated with the first wireless access point to include an identity of the second wireless access point, the neighbor information indicating a set of valid wireless access points from which to perform a handoff from the first wireless access point.

Another embodiment as described herein includes computer readable storage medium, system, hardware, etc., having instructions stored thereon. The instructions, when executed by computer processor hardware (such as associated with one or more wireless access points), cause the computer processor hardware of the system to execute operations of: establishing a communication session to communicate from the mobile communication device to a first wireless access point in the wireless network; receiving a notification indicating presence of a second wireless access point in the wireless network environment; retrieving neighbor information associated with the first wireless access point; and utilizing the neighbor information to identify that the second wireless access point is valid in which to perform a handoff from the first wireless access point.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for supporting handoffs of respective communication sessions in a wireless network. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional summary details and/or possible perspectives (permutations) of the invention(s), the reader is directed to the Detailed Description section and corresponding figures of the present disclosure as further discussed below.

Figure 1:
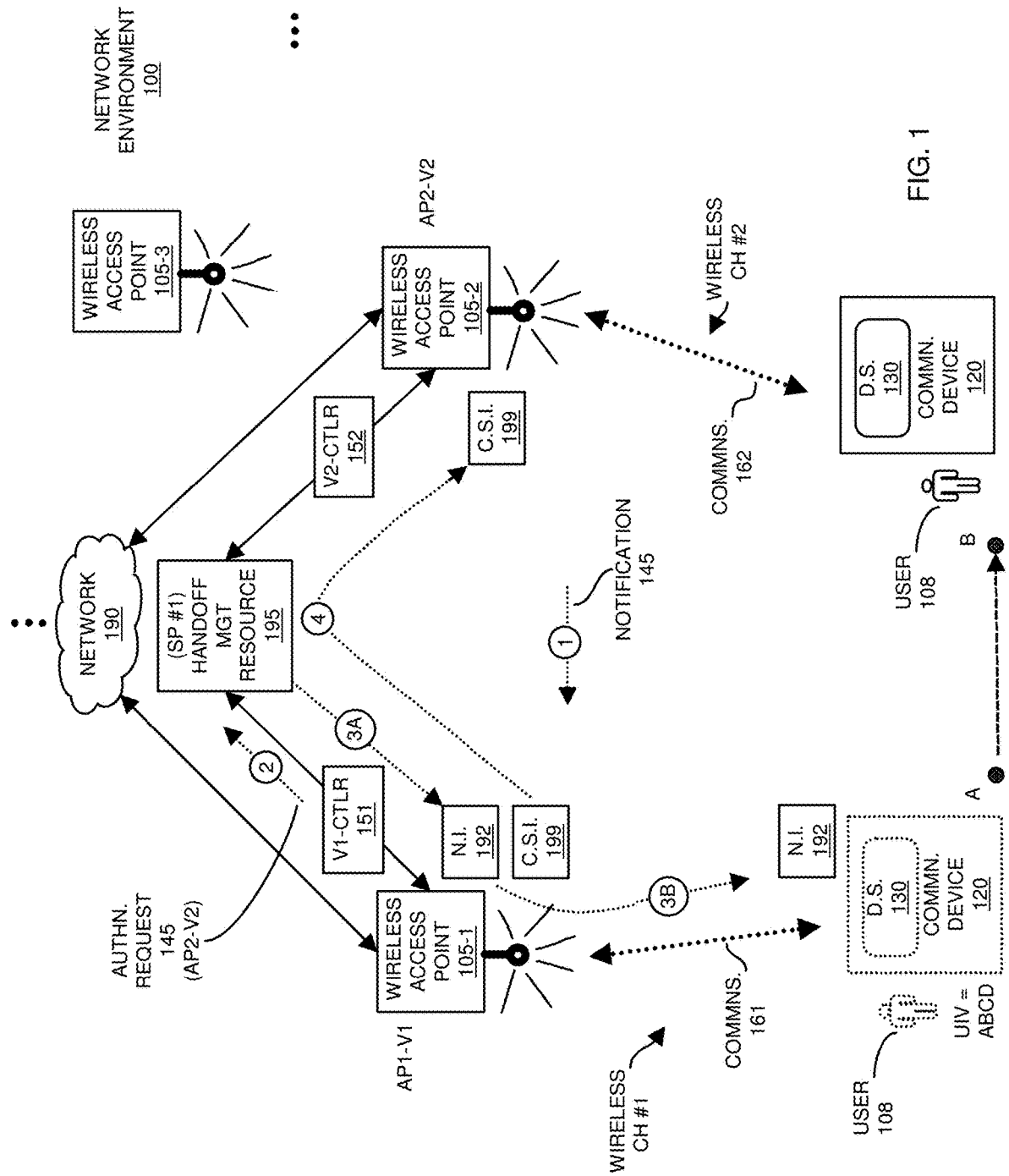
FIG. 1 is an example diagram illustrating a handoff of a communication session from a first wireless access point to a second wireless access point according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with embodiments herein, a first wireless access point receives a notification indicating presence of a second wireless access point. The first wireless access point notifies a handoff management resource of the presence of the second wireless access point. To facilitate future handoffs, the handoff management resource authenticates the second wireless access point as being a valid handoff option for a corresponding subscriber. Subsequent to authenticating the first wireless access point, the handoff management resource creates or adds an identity of the second wireless access point to neighbor list information assigned to the first wireless access point such that the neighbor list information indicates that the second wireless access point is pre-authenticated for handoffs from the first wireless access point.

The handoff management resource forwards the neighbor list to the first wireless access point. The first wireless access point distributes the neighbor list to a corresponding mobile communication device. Accordingly, via the neighbor list, the mobile communication device operated by the subscriber can be notified that the second wireless access point has been pre-authenticated for handoffs.

In accordance with the neighbor list information, the mobile communication device communicates with the second wireless access point to handoff a communication session currently handled by the first wireless access point. Subsequent to establishing a new wireless communication link with the second wireless access point, the handoff management resource conveys communication settings information associated with the handed off communication session to the second wireless access point. Handing off the communication session in this manner provides a subscriber continuous or nearly continuous access to a target networks such as the Internet.

Now, more specifically, FIG. 1 is an example diagram illustrating a network environment according to embodiments herein.

Note that each of the resources in network environment 100 including wireless access point 105-1, wireless access point 105-2, wireless access point 105-3, etc., handoff management resource 195, mobile communication device 120, vendor #1 controller 151, vendor #2 controller 152, network 190, etc., represents and/or includes appropriate hardware, software, or a combination of hardware and software to carry out functionality as discussed herein.

Note that in a controller-less environment, controller 151 and controller 152 may not be present. In such an instance, the wireless access points provide appropriate functionality as described herein.

In one embodiment, each of the wireless access points 105 in network environment 100 facilitate connectivity to corresponding network 190 such as the Internet. For example, to access network 190, communication device 120 establishes a wireless communication link with a corresponding wireless access point such as wireless access point 105-1. In an upstream direction, the wireless access point 105-1 conveys digital information in received wireless communications from the communication device 120 to one or more target server resources in network 190. In a downstream direction, the wireless access point conveys communications from one or more server resources in network 190 over a respective wireless communication link to communication device 120.

Note that network 190 can be any suitable type of network. In accordance with further embodiments, network 190 includes or is a packet-switched network facilitating distribution of communications (such as one or more data packets) in accordance with any suitable communication protocol. As a specific example embodiment, network 190 and corresponding resources therein support client/server communications and switching of data packets using source and destination address information. For example, a source address of a data packet communication indicates a corresponding resource from which the data packet is generated. A destination address of a communication (data packet) indicates a corresponding address of the resource to which the data packet is being transmitted. Each of the resources in network environment 100 use the destination address to route the respective data packets to an identified destination. The recipient (destination) of the communication uses the source address (associated with a respective communication device) to identify a particular client that transmitted the communication.

By further way of non-limiting example embodiment, a communication device (such as a mobile communication device or client device) and a respective wireless access point can communicate (over respective wireless communication links) in accordance with WiFi™ standards such as IEEE (Institute of Electrical and Electronics Engineers) 802.11a, 802.11b, 802.11g, 802.11k, 802.11n, 802.11r, etc. However, note that wireless communications are not limited to transmission via WiFi™ standards and protocols. For example, communication device 120 and wireless access points 105 can be configured to communicate in accordance with any suitable standard supporting wireless communications.

In this example embodiment, the wireless access point 105-1 is assigned unique identifier information AP1-V1 (which can represent unique network address information, SSID name, etc.). Users and corresponding communication devices in network environment 100 utilize the unique identifier information as a basis in which to perform functions such as identify the wireless access point 105-1 amongst other wireless access points, establish a connection with the wireless access point 105-1, receive communications from the wireless access point 105-1, transmit communications to the wireless access point 105-1, etc.

The wireless access point 105-2 is assigned unique identifier information AP2-V2 (which can represent unique network address information, SSID name, etc.). Users and corresponding communication devices in network environment 100 utilize the unique identifier information as a basis in which to perform functions such as identify the wireless access point 105-2 amongst other wireless access points, establish a connection with the wireless access point 105-2, receive communications from the wireless access point 105-2, transmit communications to the wireless access point 105-2, etc.

In accordance with a further illustrative embodiment, via communications 161, assume that the communication device 120 such as a client device initially establishes a wireless communication link with the wireless access point 105-1.

Communications 161 facilitate establishing a wireless communication link between the mobile communication device 120 and the first wireless access point 105-1. For example, communications 161 can include transmission of a probe request from the communication device 120 to the wireless access point 105-1. In response to receiving the probe request, the wireless access point 105-1 forwards a probe response to the communication device 120. The probe response can include any suitable information such as information notifying the communication device 120 of the availability of wireless access point 105-1 in network environment 100.

In furtherance of establishing a communication session to access network 190, via communications 161, the communication device 120 generates and transmits an authentication request to the wireless access point 105-1. The wireless access point 105-1 communicates with any suitable resource in wireless network environment 100 to authenticate the mobile communication device 120.

Subsequent to authentication of the mobile communication device 120, the communication device 120 receives an authentication response from the wireless access point 105-1. Via subsequent association, the communication device 120 establishes a wireless communication link with the first wireless access point 105-1.

Thus, via back-and-forth authentication type communications between the wireless access point 105-1 and the communication device 120, the communication device 120 is authenticated for establishing a corresponding wireless communication link with the wireless access point 105-1.

Note that the authentication and association functions as previously discussed are shown by way of non-limiting example only. Communications 161 can include any suitable back-and-forth communications facilitating creation of one or more wireless communication links between the communication device 120 and the wireless access point 105-1.

In accordance with further embodiments, the wireless communication link established between the communication device 120 and the wireless access point 105-1 is a secured communication link. In such an instance, at least a portion of communications 161 facilitate configuring the communication device 120 and the wireless access point 105-1 with appropriate encryption keys that are applied to subsequent communications conveyed or received over the corresponding wireless communication link.

As further shown, the communication device 120 is assigned unique identifier information ABCD.

Wireless access point 105-1 is assigned unique identifier information AP1-V1. The information "V1" in the unique identifier information AP1-V1 indicates that the first wireless access point 105-1 is provided and/or manufactured by a first vendor, V1 (such as Cisco™).

Wireless access point 105-2 is assigned unique identifier information AP1-V2. The value "V2" in the unique identifier information AP1-V2 indicates that the second wireless access point 105-1 is provided and/or manufactured by a first vendor, V2 (such as Ruckus™).

In this example embodiment, assume that both the first wireless access point 105-1 and the second wireless access point 105-2 are controlled and operated by a single service provider, SP1, that provides access to network 190.

When communicating data from the wireless access point 105-1 to the communication device 120, the wireless access point 105-1 encodes the wirelessly transmitted messages to the mobile communication device 120 to include a source identifier such as unique identifier value AP1-V1 (or other suitable value), indicating that the wireless access point 105-1 transmits such communications. Additionally, the wireless access point 105-1 encodes the wirelessly transmitted messages to include a destination identifier such as ABCD, indicating that such wireless messages are directed to the communication device 120.

As further shown, network environment 100 includes management resource 195 to manage information associated with wireless access points as well as manage corresponding handoffs with respect to the communication devices in network environment 100.

Note that the decision to perform the handoff of the communication device's (120) communication session from wireless access point 105-1 to wireless access point 105-2 can be made for any number of reasons such as because: the first wireless access point 105-1 is overloaded with handling other client communication sessions, the communication device 120 roams outside of a wireless coverage region provided by the first wireless access point 105-1 into a wireless coverage region provided by the second wireless access point 105-2, detection of interference in wireless channel #1, etc. Further in this illustrative example embodiment, in anticipation of performing possible future handoffs, assume that the first wireless access point 105-1 monitors a respective wireless region for presence of neighboring wireless access points. The wireless access point 105-1 can receive communications from any suitable resource indicating nearby presence of the wireless access point 105-2 in the network environment 100. For example, the wireless access point 105-1 can receive communications directly from the wireless access point 105-2 indicating its presence, the wireless access point 105-1 can receive communications from the communication device 120 indicating presence of the wireless access point 105-2, etc.

Assume further in this illustrative embodiment that the first wireless access point receives a notification 145 (such as via OPERATION #1) such as a wireless communication or beacon broadcasted by the second wireless access point 105-2) indicating presence of the second wireless access point 105-2 in the network environment 100.

In furtherance of supporting seamless or nearly seamless handoffs, to pre-authenticate the second wireless access point 105-2, the first wireless access point 105-1 forwards (such as via OPERATION #2) an identity (such as a unique network address, BSSID, etc.) of the second wireless access point 105-2 (as indicated by the received wireless communication from the first wireless access point 105-1) to an authentication server resource such as handoff management resource 195 for verification. In one embodiment, in response to receiving a pre-authentication request including the identity of the second wireless access point 105-2, the handoff management resource 195 pre-validates (authenticates) the second wireless access point 105-2 for receiving handoff of communication sessions from the first wireless access point 105-1. Authentication includes verifying that the identity of the second wireless access point 105-2 corresponds to a wireless access point owned and operated by the service provider SP1, who also provides and operates the first wireless access point 105-1.

In this example embodiment, assume that the handoff management resource 195 provides notification (such as via OPERATION #3A such as an authentication response) to the wireless access point 105-2 indicating that the second wireless access point 105-2 is part of service provider SP1's network and is therefore a valid handoff candidate for communication sessions supported by the first wireless access point 105-1. In other words, even though the first wireless access point and the second wireless access point are manufactured by different vendors V1 and V2, both the first wireless access point 105-1 and the second wireless access point 105-2 are part of a same service provider's network. In such an instance, in response to receiving a validation (pre-authentication) of the second wireless access point 105-2, the handoff management resource 195 produces neighbor information 192 associated with the first wireless access point 105-1 to include an identity of the second wireless access point 105-2 as a valid handoff candidate.

Figure 2:
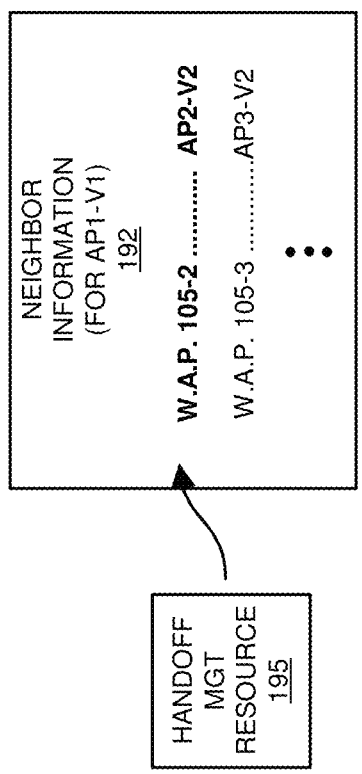
FIG. 2 is an example diagram illustrating generation of neighbor information indicating wireless access points that have been pre-authenticated for performing handoffs according to embodiments herein.

Note that FIG. 2 is an example diagram illustrating updating of the neighbor information 192 to indicate that wireless access point 105-2 is a valid handoff candidate for wireless access point 105-1.

Referring again to FIG. 1, distribution of the neighbor information 192 to the first wireless access point 105-1 thus indicates that the second wireless access point 105-2 is a valid wireless access point in which to perform a handoff from the first wireless access point 105-1.

Note that generation of neighbor information 192 to indicate that the second wireless access point 105-2 is pre-authenticated to perform a respective handoff from wireless access point 105-1 is shown by way of non-limiting example. For example, further embodiments herein can include generating neighbor information 192 associated with the first wireless access point 105-1 to indicate from which of one or more wireless access points in the wireless network environment 100 the first wireless access point 105-1 is pre-authenticated to receive handoffs. In such an instance, neighbor information 192 can be configured to indicate that the first wireless access point 105-1 is pre-authenticated to receive possible handoffs from the second wireless access point 105-2. Accordingly, the neighbor information 192 for each respective wireless access point can be a pre-authenticated "to" and/or "from" list.

In this example embodiment, as previously discussed, because the identity of the second wireless access point 105-2 is pre-authenticated, it is added to the neighbor information 192 as a possible candidate in which to transfer or receive a wireless handoff. Additionally, in accordance with the authentication, the corresponding neighbor information associated with second wireless access point 105-2 can be modified to include an identity of the first wireless access point 105-1 as a valid candidate from which to receive handoffs from or convey handoffs to the first wireless access point 105-1.

In yet further embodiments, the wireless access points can be notified of pre-authentication via transmission of base station management messages from the handoff management resource 195 to the wireless access points indicating identities of associated access points to which or from which handoffs are acceptable.

In accordance with further embodiments, the communication device 120 can be configured to generate a request (query) to the first wireless access point 105-1 for retrieval of neighbor information 192. In response to the request, the communication device 120 receives (such as via OPERATION #3B) the neighbor information 192 including a list of valid wireless access points in which to potentially perform a handoff. Alternatively, the management resource 195 or other suitable resource automatically forwards the neighbor information 192 to the first wireless access point 105-1 and/or mobile communication device 120.

Note further that the mobile communication device can receive the neighbor information 192 at any suitable time such as at a start of establishing a wireless communication session with the wireless access point 105-1, just before performing a respective handoff, etc.

If desired, the mobile communication device 120 can be configured to generate a probe (a discovery request) to each of the wireless access points specified in the neighbor information 192 in order to identify which, if any, wireless access points are available perform a respective handoff.

Further in this example embodiment, subsequent to establishing the wireless communication link and corresponding wireless communication session between the communication device 120 and the wireless access point 105-1, assume that the user 108 operating the communication device 120 roams from location A to location B in network environment 100.

Figure 5:
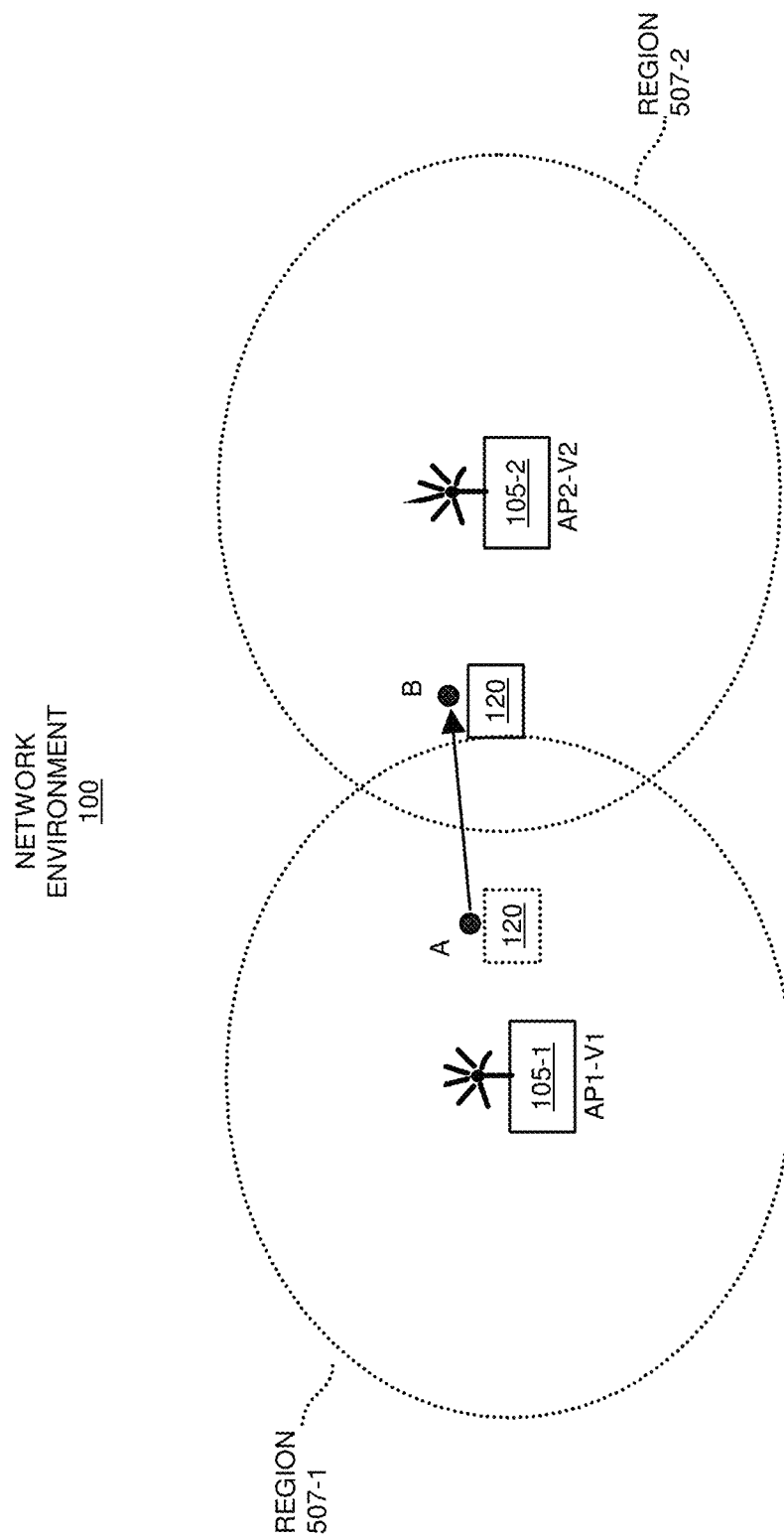
FIG. 5 is an example diagram illustrating regions of wireless coverage provided by multiple wireless access points and the corresponding handoff of a communication session from a first wireless access point to a second wireless access point according to embodiments herein.

An example of roaming is shown in FIG. 5 in which the mobile communication device 120 at location A roams outside of the region of wireless coverage 507-1 supported by the first wireless access point 105-1 into the region of wireless coverage 507-2 at location B supported by the second wireless access point 105-2. As shown in network environment 100 of FIG. 5, the first wireless access point 105-1 and the second wireless access point 105-2 can be disparately located with respect to each other.

Further in this example embodiment, the region of wireless coverage 507-1 provided by wireless access point 105-1 at least partially overlaps with the region of wireless coverage 507-2 provided by wireless access point 105-2. As previously discussed, and as further discussed below, when the communication device 120-1 roams outside of region of wireless coverage 507-1 into region of wireless coverage 507-2, the management resource 195 and/or one or more other suitable resource facilitates a handoff of the communication session from the wireless access point 105-1 to wireless access point 105-2.

In accordance with further embodiments, note that any suitable entity can be configured to decide whether to perform a respective handoff. In one embodiment, the mobile communication device 120 is configured to decide whether to initiate a respective handoff to the second wireless access point 105-2 in response to any of multiple different conditions such as that the mobile communication device 120 roams outside of a region of wireless coverage provided by the first wireless access point 105-1 into a region of wireless coverage provided by the second access point 105-2 as discussed above.

Assume that the mobile communication device 120 (or other suitable resource) chooses the second wireless access point 105-2 from the neighbor information 192 in which to perform a respective handoff. In furtherance of such a decision, the mobile communication device 120 disassociates itself with the first wireless access point 105-1 to terminate an original wireless communication link with the first wireless access point 105-1. Additionally, in furtherance of performing a respective handoff to the second wireless access point 105-2, the mobile communication device 120 communicates corresponding session identifier information (such as an identity of the communication session currently supported by the first wireless access point 105-1) to the second wireless access point 105-2 in order to perform the handoff.

In one embodiment, in furtherance of performing the handoff and providing the second wireless access point 105-2 the corresponding session identifier information associated with the communication session between the first wireless access point 105- and the mobile communication device 120, the mobile communication device 120 transmits the corresponding session identifier information (such as including key identifier information associated with the communication session being handed off) to the second wireless access point in a respective request message (such as a fast transfer request). The second wireless access point 105-2 transmits an appropriate authentication response to the mobile communication device 120. Thereafter, the mobile communication device 120 associates itself with the second wireless access point 105-2 in order to establish the handoff wireless communication link replacing the original wireless communication link between the mobile communication device 120 and the first wireless access point 105-1.

In accordance with further embodiments, the second wireless access point 105-2 uses the received session identifier information associated with the communication session being handed off to retrieve appropriate communication settings information 199 associated with the original communication session between the first wireless access point 105-1 and the mobile communication device 120. This enables the second wireless access point 105-2 to provide a seamless handoff. For example, in one embodiment, the handoff management resource 195 (or other suitable resource such as wireless access point 105-1, controller 151, etc.) keeps track of the communication settings information 199 associated with the user's 108 communication session initially managed by the first wireless access point 105-1. In furtherance of supporting the handoff, the handoff management resource 195 (or other suitable resource such as wireless access point 105-1, controller 151, etc.) forwards (such as via OPERATION #4) the communication settings information 199 associated with the communication session to the controller 152 and/or the second wireless access point 105-2.

Thus, to facilitate the handoff, the second wireless access point 105-2 can be notified of the intent to handoff as well as corresponding communication settings information 199 used by the first wireless access point 105-1 to support communications with the mobile communication device 120 (client device). Providing the controller 152 and/or second wireless access point 105-2 notification of the communication settings information 199 associated with the communication session between mobile communication device 120 and the first wireless access point 105-1 ensures that the second wireless access point will be able to use the same settings and provide a seamless handoff of the communication session associated with communication device.

In other words, via conveyance of communication settings information 199, the same encryption key established and used to encrypt wireless messages transmitted from the wireless access point 105-1 to the communication device 120 can be forwarded to the controller 152 and/or wireless access point 105-2 to encrypt wireless messages transmitted from the wireless access point 105-2 to the communication device 120.

Thus, the mobile communication device 120 can be configured to initiate a respective handoff. Alternatively, however, note that a resource other than mobile communication device 120 can decide to perform a respective handoff with respect to the communication session supported in by the first wireless access point 105-1. For example, handoff management resource 195 or other suitable resource remotely located with respect to the mobile communication device 120 and managing network environment 100 can be configured to make a decision to handoff the communication session associated with the mobile communication device 120 from the first wireless access point 105-1 to the second wireless access point 105-2. In one embodiment, the handoff management resource 195 makes a decision to perform a handoff based at least in part on the neighbor information 192 indicating pre-authentication of the second wireless access point 105-2 as a handoff candidate.

In this latter example of initiating a handoff, the handoff management resource 195 initiates transmission of a wireless communication through the first wireless access point 105-1 to the mobile communication device 120. The wireless communication conveyed to the mobile communication device 120 from the first wireless access point 105-1 includes the identity of the second wireless access point 105-2 in which to perform the handoff. This notifies the mobile communication device 120 to perform a handoff of a respective communication session to the second wireless access point 105-2. In furtherance of the handoff, the mobile communication device 120 can be configured to communicate with the second wireless access point 105-2 to facilitate the respective handoff.

In a similar manner as previously discussed, the second wireless access point 105-2 can be configured to receive or retrieve communication setting information 199 associated with the communication session to support a seamless or near seamless handoff. After terminating the wireless communication link between the communication device 120 and first wireless access point 105-1 over wireless channel #1, the mobile communication device 120 resumes communications with network 190 over the wireless communication link established between the mobile communication device 120 and the wireless access point 105-2.

Figure 3:
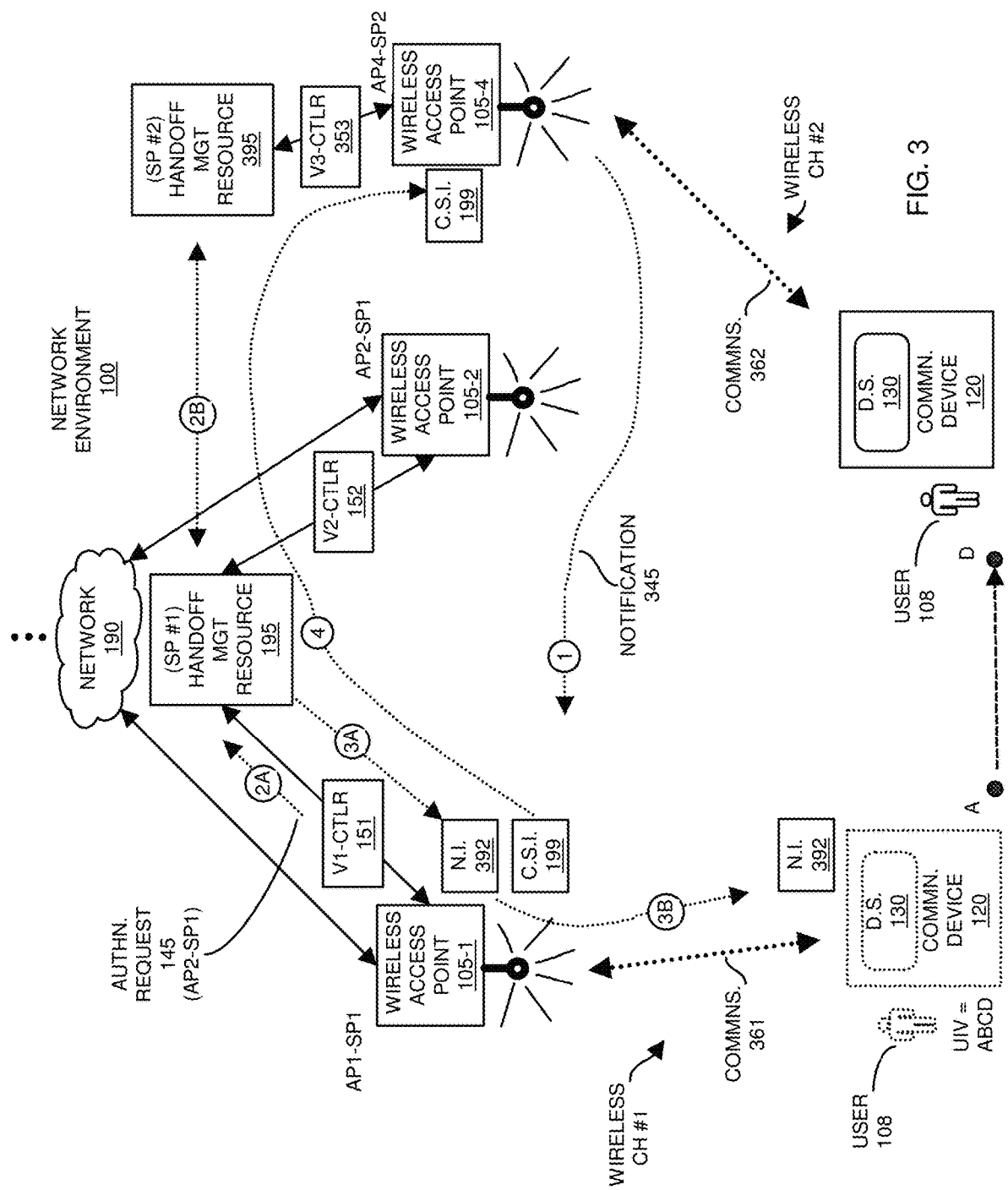
FIG. 3 is an example diagram illustrating a handoff of a communication session from a first wireless access point to a second wireless access point according to embodiments herein.

FIG. 3 is an example diagram illustrating a handoff of a communication session from a first service provider's wireless access point to a second service provider's wireless access point according to embodiments herein.

This example embodiment is similar to the embodiment as discussed above with respect to FIG. 1. However, in the embodiment is shown in FIG. 3, if the corresponding wireless access point being authenticated by a handoff management resource 195 does not reside within the first service provider's network, the handoff management resource 195 checks if the corresponding wireless access point in question resides in any corresponding partner networks associated with the first service provider. If so, the handoff management resource 195 includes the identity of the wireless access point in neighbor information to indicate that it is a valid access point in which to perform a handoff.

More specifically, in this example embodiment, assume that the wireless access point receives notification 345 (such as via OPERATION #1) indicating presence of the wireless access point 105-4 in network environment 100. The notification 345 can be received from any suitable resource.

In a manner as previously discussed, the wireless access point 105-1 communicates (such as via OPERATION 2A) an identity of the wireless access point 105-4 to the handoff management resource 195 for pre-authentication. The handoff management resource 195 operated by the first service provider checks whether the wireless access point 105-4 is part of its own network.

In this instance, because the wireless access point 105-4 is owned and operated by the second service provider (SP2), the handoff management resource 195 does not find the wireless access point 105-4 as being part of the first service provider's network. In such an instance, the handoff management resource 195 performs a backup check to identify whether or not the wireless access point 105-4 resides in a partner network that supports network access to the first service provider's subscribers. For example, the first service provider may have an agreement with the second service provider in which the second service provider accepts handoffs for respective SP1 subscribers. In such an instance, the handoff management resource 195 forwards (such as via OPERATION #2B) an identity of the wireless access point 105-4 to the handoff management resource 395 operated by the second service provider.

In response to receiving feedback from the handoff management resource 395 that the second wireless access point 105-4 (AP4-SP2) operated by the second service provider SP2 is a valid access point in which to perform a handoff with any of the first service provider's access points, the handoff management resource 195 updates the neighbor information 392 to indicate that the wireless access point 105-4, although operated by a second service provider instead of the first service provider SP #1, is a valid access point in which to potentially perform a handoff from wireless access point 105-1.

Figure 4:
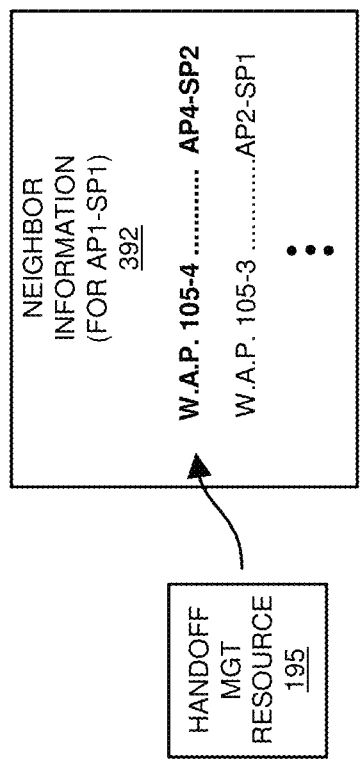
FIG. 4 is an example diagram illustrating generation of neighbor information indicating multiple service providers' wireless access points that have been pre-authenticated for performing handoffs according to embodiments herein.

FIG. 4 is an example diagram illustrating updating of the neighbor information across partner networks according to embodiments herein.

As shown, in response to detecting that the wireless access point 105-4 resides in a partner's (second service provider SP2) wireless network, and that the second service provider allows handoffs with respect to access points operated by the first service provider, the handoff management resource 195 updates the neighbor information 392 to include the identity of the wireless access point 105-4 as a valid and authenticated handoff candidate.

Thus, the first wireless access point 105-1 may reside in a first service provider's wireless network; the second wireless access point 105-2 may reside in a second service provider's wireless network. The first service provider and the second service provider can be partners that provide shared used of content delivery services to mobile communication device 120 and subscribers via handoff of a corresponding communication session across the different service providers' equipment.

Referring again to FIG. 3, in a similar manner as previously discussed, the handoff management resource 195 forwards (such as via OPERATION #3A) the neighbor information 392 to the wireless access point 105-1. The wireless access point 105-1 forwards (such as via OPERATION #3B) the neighbor information 392 to the communication device 120.

In a similar manner as previously discussed, the communication device 120 or other suitable resource then makes a decision regarding which if any of the multiple wireless access points listed in the neighbor information 392 in which to perform a respective handoff. Assume in this example embodiment that the communication device 120 selects wireless access point 105-4 and then initiates a handoff to the wireless access point 105-4. In such an instance, to facilitate the handoff in a manner as previously discussed, the handoff management resource 195 initiates distribution of communications settings information 199 associated with the handed off communication session with the wireless access point 105-4. This alleviates the wireless access point 105-4 and communication device 120 from having to reestablish a completely new communication session including new encryption keys to support secured wireless communications.

Thus, regardless of whether the mobile communication device 120 or a remote handoff management function makes a decision to perform a handoff, the pre-authentication of neighboring wireless access points across different vendor access points and different service provider's access points assists in providing more seamless handoffs across different vendor equipment, reducing Internet access downtime.

As previously discussed, conventional handoffs across different vendor equipment or service provider networks require that the mobile communication device 120 terminate a current wireless communication link and then establish a new wireless communication link (and corresponding authentication and session information from scratch) in order to transfer a communication session from one access point and another. As described herein, reusing communication settings information 199 from one wireless access point to the next reduces downtime that otherwise occurs when it is necessary to reestablish encryption keys to support secured communications on the new wireless link.

Figure 6:
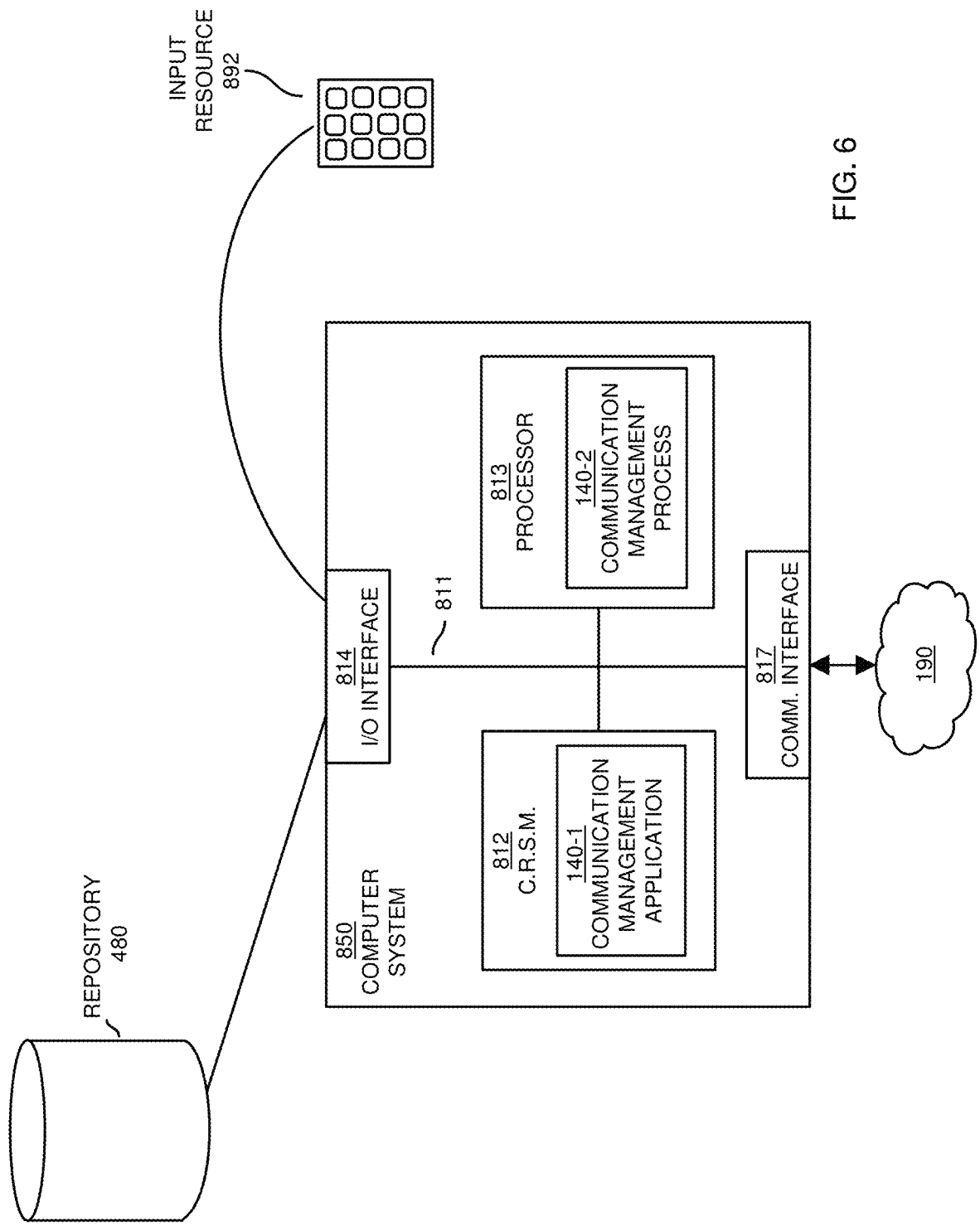
FIG. 6 is an example diagram illustrating computer processor hardware to carry out operations according to embodiments herein.

FIG. 6 is a diagram illustrating an example computer architecture in which to execute any of the functionality according to embodiments herein. Any of the different processing techniques can be implemented via execution of software code on computer processor hardware. Computer system 850 may reside in the communication device 120; computer system 850 may reside in a respective wireless access point; computer system may reside in the remote management resource 195; and so on.

As shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Note again that the computer system 850 can be located at any suitable locations in network environment 100 to carry out the operations as discussed herein. For example, computer processor hardware (i.e., processor 813 and/or computer system 850) and/or communication management application 140-1 can be located in a single location or can be distributed amongst multiple locations. Communication management application 140-1 can be configured to execute the operations as discussed with respect to management resource 195, communication device 120, wireless access point 105-1, wireless access point 105-2, controller 151, controller 152, and so on.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with communication management application 140-1.

Communications interface 817 enables the computer system 850 and processor resource 813 to communicate over a resource such networks 190. I/O interface 814 enables processor resource 813 to access data from a local or remote location, control a respective display screen, receive input, etc.

As shown, computer readable storage media 812 can be encoded with communication management application 140-1 (e.g., software, firmware, etc.) executed by processor 813. Communication management application 140-1 can be configured to include instructions to implement any of the operations as discussed herein associated with the communication device 120, wireless access point 105-1, wireless access point 105-2, management resource 195, etc.

During operation of one embodiment, processor 813 accesses computer readable storage media 812 via the use of interconnect 811 in order to launch, run, execute, interpret or otherwise perform the instructions in communication management application 140-1 stored on computer readable storage medium 812.

Execution of the communication management application 140-1 produces processing functionality such as communication management process 140-2 in processor resource 813. In other words, the communication management process 140-2 associated with processor resource 813 represents one or more aspects of executing communication management application 140-1 within or upon the processor resource 813 in the computer system 850.

Those skilled in the art will understand that the computer system 850 can include other processes and/or software and hardware components, such as an operating system that controls allocation and use of hardware resources to execute communication management application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

As previously discussed, the computer system 850 may reside at any location or multiple locations in network environment 100. The computer system 850 can be included in any suitable resource in network environment 100 to implement any of the functionality as discussed herein.

Functionality supported by the different resources will now be discussed via flowcharts in FIGS. 7-9. Note that the operations in the flowcharts below can be executed in any suitable order.

Figure 7:
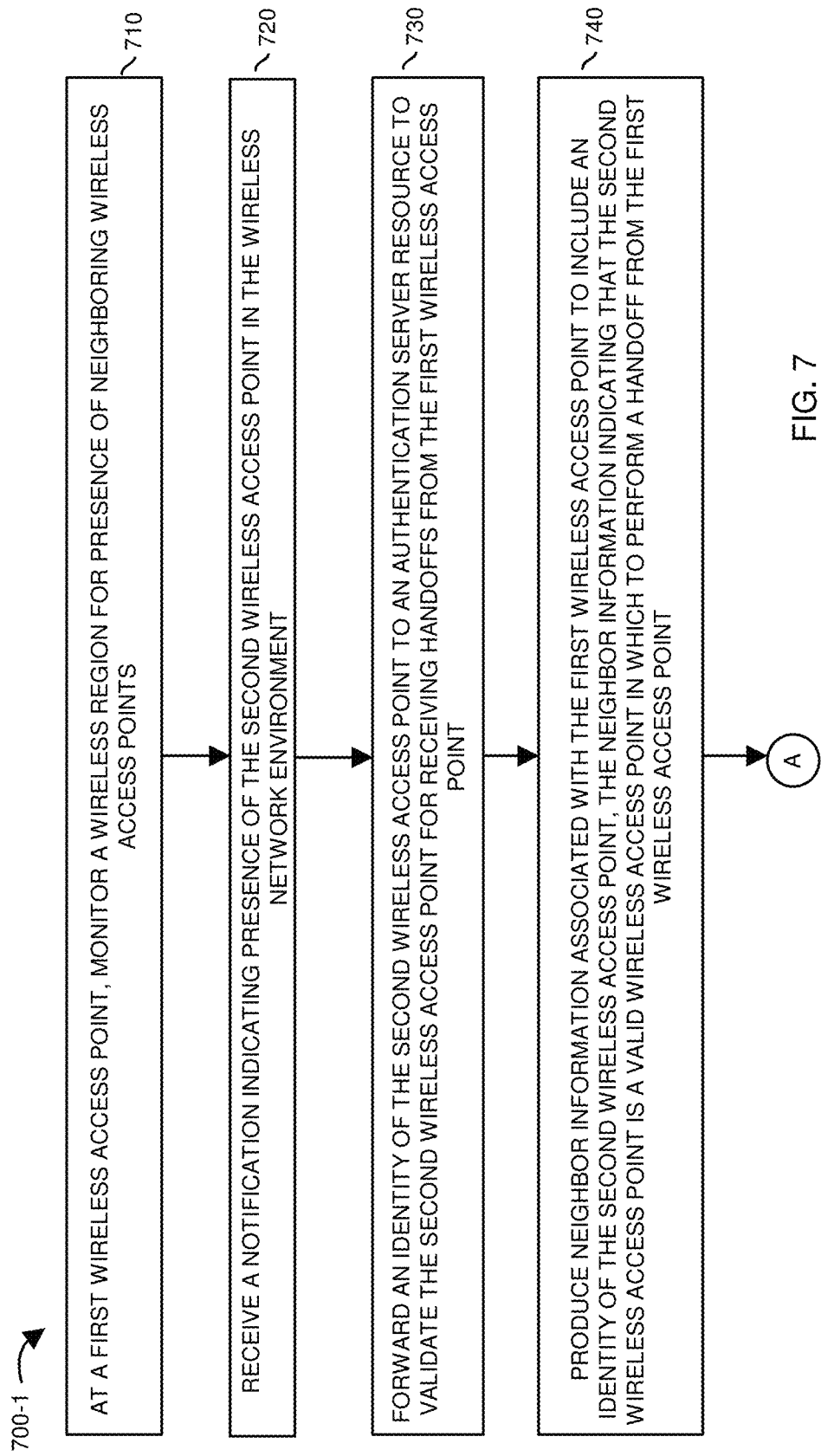
FIGS. 7-9 are example diagrams illustrating methods according to embodiments herein.
Figure 8:
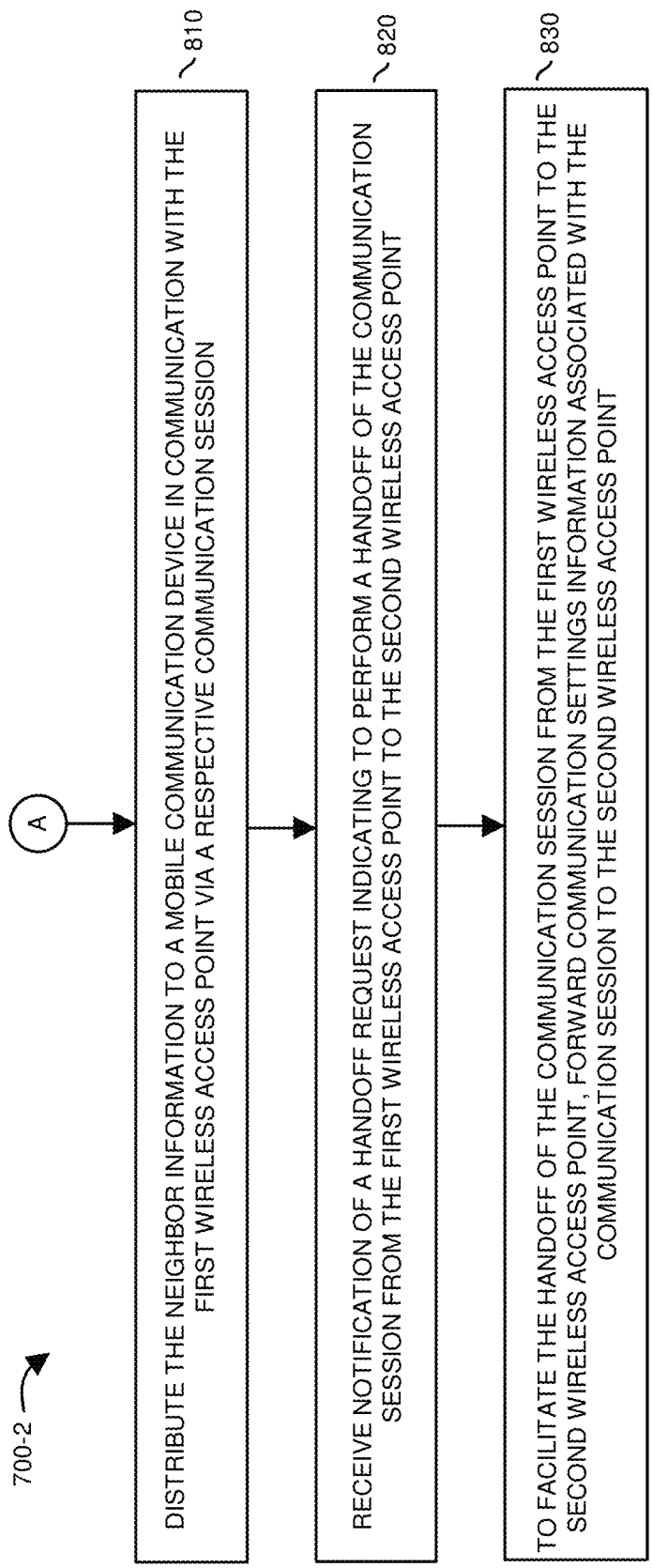

FIGS. 7 and 8 combine to form a flowchart 700 illustrating an example method according to embodiments herein. Note that there will be some overlap with respect to concepts as discussed above.

In processing operation 710 of flowchart 700-1 in FIG. 7, the wireless access point 105-1 or other suitable resource monitors a corresponding region of wireless coverage 507-1 for presence of neighboring (i.e., nearby) wireless access points.

In processing operation 720, the first wireless access point 105-1 receives a notification 145 (such as a wireless message transmitted by the wireless access point 105-2). The notification 145 indicates presence of the second wireless access point 105-2 in the wireless network environment 100.

In processing operation 730, the first wireless access point 105-1 forwards an identity of the second wireless access point 105-2 to the management resource 195. In one embodiment, as previously discussed, the handoff management resource 195 is an authentication server resource associated with a first service provider. The handoff management resource 195 pre-authenticates the second wireless access point 105-2 for receiving handoffs from the first wireless access point 105-1.

In processing operation 740, the handoff management resource 195 completes authenticating the second wireless access point 105-2 as being a valid access point in which to handoff from the first wireless access point 105-1. The handoff management resource 195 produces neighbor information 192 associated with the first wireless access point 105-1 to include an identity of the second wireless access point 105-2 such that the neighbor information 192 now indicates that the second wireless access point 105-2 is a valid wireless access point in which to perform a handoff of communication sessions from the first wireless access point 105-1.

In processing operation 810 in flowchart 700-2 of FIG. 8, the management resource 195 distributes the neighbor information 192 to a mobile communication device 120 in communication with the first wireless access point 105-1. As previously discussed, the first wireless access point 105-1 supports a respective communication session between the mobile communication device 120 and the first wireless access point 105-1.

In processing operation 820, the management resource 195 receives notification of a handoff request, indicating to perform a handoff of the communication session from the first wireless access point 105-1 to the second wireless access point 105-2.

In processing operation 830, to facilitate the handoff of the communication session from the first wireless access point 105-1 to the second wireless access point 105-2, the handoff management resource or other suitable resource forwards communication settings information 199 associated with the communication session being handed off to the second wireless access point 105-2. Subsequent to terminating the wireless communication link with the first wireless access point 105-1, the communication device 120 communicates through the wireless access point 105-2 to access corresponding network 190. The second wireless access point 105-2 uses the same encryption keys used by the first wireless access point to support a secured wireless communication link.

Figure 9:
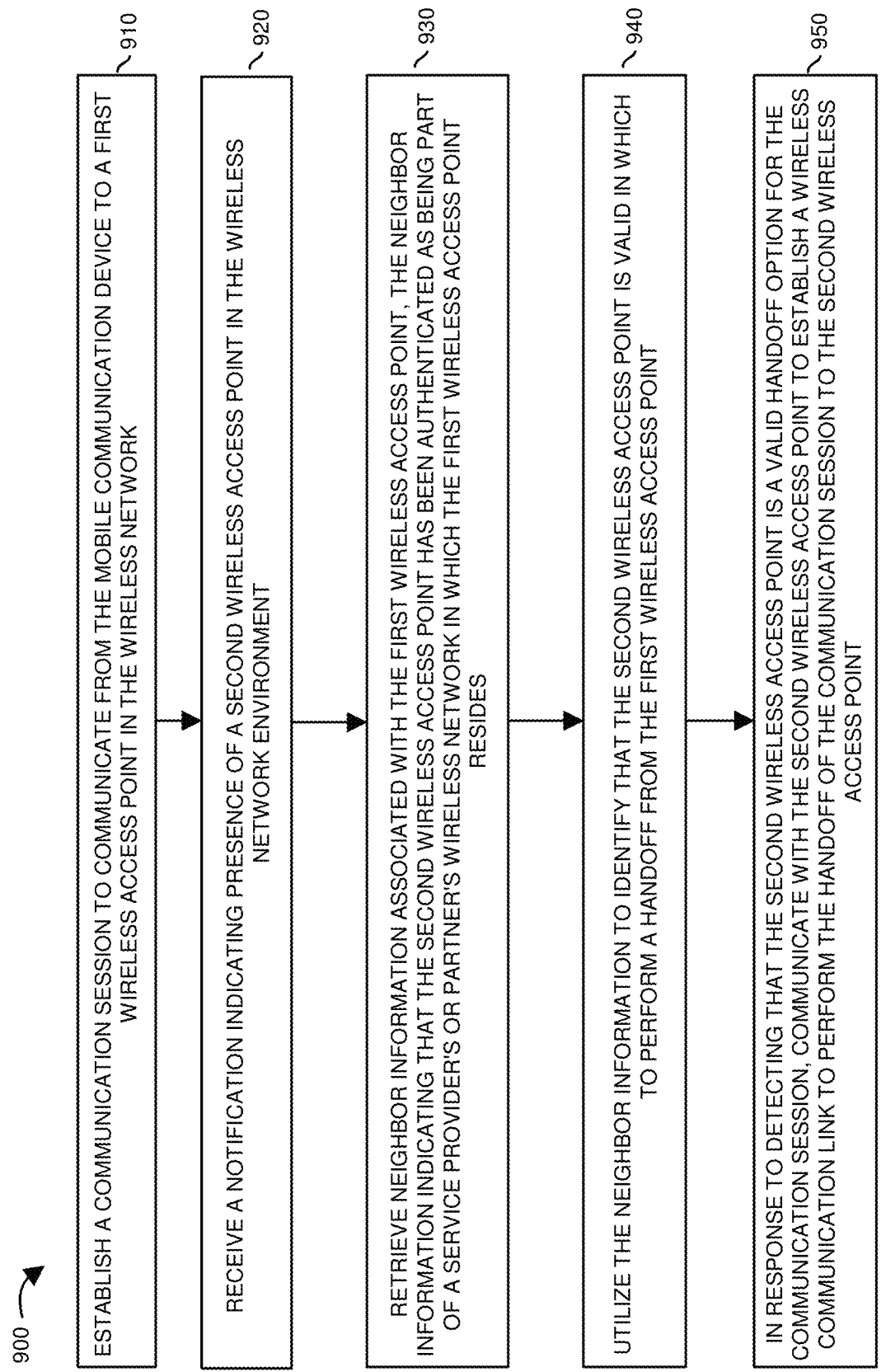

FIG. 9 is a flowchart 900 illustrating an example method according to embodiments herein. Note that there will be some overlap with respect to concepts as discussed above.

In processing operation 910, the mobile communication device 120 establishes a communication session to communicate from the mobile communication device 120 to the first wireless access point 105-1 in the wireless network environment 100.

In processing operation 920, the first wireless access point 105-1 receives a notification 145 indicating presence of a second wireless access point 105-2 in the wireless network environment 100.

In processing operation 930, mobile communication device 120 retrieves neighbor information 192 associated with the first wireless access point 105-1.

In processing operation 940, the mobile communication device 120 utilizes the neighbor information 192 to identify that the second wireless access point is valid in which to perform a handoff from the first wireless access point 105-1. As previously discussed, the neighbor information 192 indicates that the second wireless access point 105-2 has been pre-authenticated as being part of a service provider's or partner's wireless network in which the first wireless access point 105-1 resides. Accordingly, it is known by the first wireless access point 105-1 in the mobile communication device 120 that the mobile communication device 120 is permitted to perform the handoff from the first wireless access point 105-1 to the second wireless access point 105-2.

In processing operation 950, in response to detecting that the second wireless access point 105-2 is a valid option in which to handoff the communication session, the mobile communication device 120 communicates with the second wireless access point 105-2 to establish a new wireless communication link to perform the handoff of the communication session to the second wireless access point 105-2.

Note again that techniques herein are well suited for supporting handoffs in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
via computer processor hardware operated in a wireless network environment including a first wireless access point and a second wireless access point, performing operations of:
at the first wireless access point, receiving a notification indicating presence of the second wireless access point in the wireless network environment;
validating the second wireless access point for receiving handoffs from the first wireless access point;
forwarding neighbor information from a handoff manager resource to the first wireless access point, the handoff manager resource managing handoffs between the first wireless access point and the second wireless access point, the neighbor information indicating an identity of the second wireless access point, the neighbor information further indicating that the second wireless access point is a valid wireless access point in which to perform a handoff from the first wireless access point;
communicating the neighbor information to a mobile communication device; and
in response to receiving selection of the second wireless access point by the mobile communication device, initiating the handoff of the mobile communication device from the first wireless access point to the second wireless access point.

2. The method as in claim 1, wherein the first wireless access point is manufactured by a first vendor; and
wherein the second wireless access point is manufactured by a second vendor.

3. The method as in claim 1 further comprising: receiving the notification indicating the presence of the second wireless access point over a wireless medium from the second wireless access point, the notification broadcasted by the second wireless access point to indicate its presence in the wireless network environment.

4. The method as in claim 1 further comprising:
receiving the notification from the mobile communication device that receives a beacon from the second wireless access point, the received beacon indicating presence of the second wireless access point in the wireless network.

5. The method as in claim 1, wherein validating the second wireless access point includes: at the first wireless access point, performing authentication of the second wireless access point with the handoff manager resource.

6. The method as in claim 5, wherein performing authentication of the second wireless access point includes:
obtaining a unique identifier value assigned to the first wireless access point;
forwarding the unique identifier value to the handoff manager resource; and
receiving an authentication response from the handoff manager resource, the authentication response indicating that the second wireless access point is part of a service provider's wireless network in which the first wireless access point resides.

7. The method as in claim 6, wherein producing the neighbor information further comprises:
in accordance with the authentication response, adding an identity of the second wireless access point to the neighbor information, addition of the identity of the second wireless access point to the neighbor information indicating that the second wireless access point is a valid handoff option in which to perform the handoff from the first wireless access point.

8. The method as in claim 5, wherein initiating the handoff includes:
performing the handoff of the mobile communication device from the first wireless access point to the second wireless access point, the first wireless access point using encryption key information to securely communicate with the mobile communication device prior to the handoff; and
to facilitate the handoff, communicating the encryption key information to the second wireless access point, the second wireless access point using the encryption key information to securely communicate with the mobile communication device after the handoff.

9. The method as in claim 8, wherein performing authentication of the second wireless access point includes:
obtaining a unique identifier value assigned to the first wireless access point;
forwarding the unique identifier value to the handoff manager resource; and
receiving an authentication response from the handoff manager resource, the authentication response indicating that the second wireless access point is part of a service provider's wireless network in which the first wireless access point resides.

10. The method as in claim 9, wherein producing the neighbor information further comprises:
in accordance with the authentication response, adding an identity of the second wireless access point to the neighbor information, addition of the identity of the second wireless access point to the neighbor information indicating that the second wireless access point is a valid handoff option in which to perform the handoff from the first wireless access point.

11. The method as in claim 1 further comprising:
from the first wireless access point, providing notification of the neighbor information to the mobile communication device in communication with the first wireless access point via an established communication session between the mobile communication device and the first wireless access point.

12. The method as in claim 11 further comprising:
receiving a handoff request from the mobile communication device to perform the handoff of the communication session from the first wireless access point to the second wireless access point, the handoff request received from the mobile communication device through the second wireless access point.

13. The method as in claim 12 further comprising:
to facilitate the handoff of the communication session from the first wireless access point to the second wireless access point, forwarding communication settings information associated with the established communication session between the mobile communication device and the first wireless access point to the second wireless access point.

14. The method as in claim 12, wherein the communication settings information includes encryption key information used to support communications between the first wireless access point and the mobile communication device before the handoff.

15. The method as in claim 14 further comprising:
using the encryption key information at the second wireless access point to communicate with the mobile communication device after the handoff.

16. The method as in claim 1, wherein the first wireless access point resides in a first service provider's wireless network and the second wireless access point resides in a second service provider's wireless network, the first service provider and the second service provider partnering to provide shared used of content delivery services to the mobile communication device in communication with the first wireless access point via a corresponding communication session;
wherein authentication of the second wireless access point includes: in response to detecting that the second wireless access point resides outside of the first service provider's wireless network, communicating with an authentication resource operated by the second service provider to verify that the second wireless access point is a valid wireless access point from which to handoff the corresponding communication session from the first wireless access point to the second wireless access point.

17. The method as in claim 16 further comprising:
conveying communication settings information associated with the corresponding communication session to the second wireless access point to facilitate the handoff of the corresponding communication session from the first wireless access point to the second wireless access point.

18. The method as in claim 1, wherein validating the second wireless access point for receiving handoffs from the first wireless access point includes:
in response to receiving a request from the first wireless access point to validate the second wireless access point, verifying that the second wireless access point and the first wireless access point are both part of a same network owned and operated by a particular service provider.

19. The method as in claim 1 further comprising:
in accordance with the neighbor information, performing the handoff of the mobile communication device from the first wireless access point to the second wireless access point, the first wireless access point using encryption key information to securely communicate with the mobile communication device prior to the handoff; and
to facilitate the handoff, communicating the encryption key information to the second wireless access point, the second wireless access point using the encryption key information to securely communicate with the mobile communication device after the handoff.

20. The method as in claim 19, wherein the first wireless access point is manufactured by a first vendor; and
wherein the second wireless access point is manufactured by a second vendor.

21. A method comprising:
via computer processor hardware operated in a mobile communication device roaming in a wireless network environment, performing operations of:
establishing a communication session to communicate from the mobile communication device to a first wireless access point in the wireless network environment;
receiving a notification indicating presence of a second wireless access point in the wireless network environment;
receiving neighbor information from the first wireless access point, the neighbor information generated by a handoff manager resource disparately located with respect to the first wireless access point and the second wireless access point;
utilizing the neighbor information at the mobile communication device to identify that the second wireless access point is valid in which to perform a handoff from the first wireless access point;
selecting the second wireless access point from the neighbor information; and
initiating the handoff of the mobile communication device from the first wireless access point to the second wireless access point.

22. The method as in claim 21, wherein initiating the handoff of the mobile communication device from the first wireless access point to the second wireless access point includes:
in response to detecting that the second wireless access point is a valid handoff option for the communication session, communicating with the second wireless access point to establish a wireless communication link to perform the handoff of the communication session to the second wireless access point.

23. The method as in claim 21, wherein initiating the handoff of the mobile communication device includes:
transmitting session identifier information associated with the communication session from the mobile communication device to the second wireless access point, the session identifier information notifying the second wireless access point of an intent to handoff the communication session from the first wireless access point to the second wireless access point, the notification prompting the second wireless access point to retrieve communication settings information associated with the communication session.

24. The method as in claim 21, wherein retrieving neighbor information includes:
receiving the neighbor information in response to transmitting a query to the first wireless access point, the query requesting a list of valid wireless access points in which to perform the handoff.

25. The method as in claim 21, wherein the neighbor information indicates to the mobile communication device that the second wireless access point has been authenticated as being part of a service provider's wireless network in which the first wireless access point resides.

* * * * *